US012130365B2

(12) United States Patent
Gupta

(10) Patent No.: US 12,130,365 B2
(45) Date of Patent: Oct. 29, 2024

(54) NON-LINEAR SATELLITE STATE MODELING TECHNIQUES

(71) Applicant: AJEETH, INC., Torrance, CA (US)

(72) Inventor: Surender Kumar Gupta, Torrance, CA (US)

(73) Assignee: AJEETH, INC., Torrance, CA (US)

( * ) Notice: Subject to any disclaimer, the term of this patent is extended or adjusted under 35 U.S.C. 154(b) by 717 days.

(21) Appl. No.: 17/246,630

(22) Filed: May 1, 2021

(65) Prior Publication Data

US 2021/0341625 A1   Nov. 4, 2021

Related U.S. Application Data

(60) Provisional application No. 63/019,233, filed on May 1, 2020.

(51) Int. Cl.
| | |
|---|---|
| *G01S 19/07* | (2010.01) |
| *G01S 19/24* | (2010.01) |
| *G01S 19/26* | (2010.01) |
| *G01S 19/27* | (2010.01) |
| *G06N 20/00* | (2019.01) |

(52) U.S. Cl.
CPC ............ *G01S 19/07* (2013.01); *G01S 19/243* (2013.01); *G01S 19/26* (2013.01); *G01S 19/27* (2013.01); *G06N 20/00* (2019.01)

(58) Field of Classification Search
CPC ........ G01S 19/02; G01S 19/07; G01S 19/243; G01S 19/26; G01S 19/27; G06N 20/00; G06N 3/084

USPC .............. 342/358, 357.395, 357.44, 357.63, 342/357.65, 357.66

See application file for complete search history.

(56) References Cited

U.S. PATENT DOCUMENTS

| | | | | |
|---|---|---|---|---|
| 5,774,831 | A * | 6/1998 | Gupta ................ | G01S 19/40 701/481 |
| 8,120,529 | B2 | 2/2012 | Bar-Sever et al. | |
| 9,057,780 | B2 | 6/2015 | Bar-Sever et al. | |
| 9,261,597 | B2 | 2/2016 | Bar-Sever et al. | |
| 9,766,349 | B1 * | 9/2017 | Madhow ............. | G01S 19/11 |
| 10,889,302 | B2 * | 1/2021 | Kana ................ | B60W 50/0205 |
| 2015/0168557 | A1 * | 6/2015 | Zou ................... | G01S 19/425 342/357.42 |

(Continued)

FOREIGN PATENT DOCUMENTS

| | | | | |
|---|---|---|---|---|
| CA | 2848217 A1 * | 3/2013 | ........... | G01C 21/165 |
| CN | 108205146 B * | 6/2022 | ............. | G01S 19/24 |
| CN | 116819585 A * | 9/2023 | ............. | Y02T 10/40 |

*Primary Examiner* — Chuong P Nguyen
(74) *Attorney, Agent, or Firm* — Wei IP Law, PC

(57) ABSTRACT

Techniques are provided for non-linear satellite state modeling. First global navigation satellite systems (GNSS) signal data is obtained from a set of GNSS satellites. First satellite state data is obtained. The first satellite state data includes orbit data for the set of GNSS satellites. A non-linear satellite state model that includes a plurality of model parameters is generated. The non-linear satellite state model is generated by adjusting the plurality of model parameters based on the first GNSS signal data and the first satellite state data. The non-linear satellite state model outputs satellite state data based on GNSS signal data. Second GNSS signal data is obtained from the set of GNSS satellites. A set of updated satellite state data is calculated using the non-linear satellite state model and the second GNSS signal data.

20 Claims, 7 Drawing Sheets

(56) References Cited

U.S. PATENT DOCUMENTS

2020/0001886 A1* 1/2020 Kana .................... G01C 21/20

* cited by examiner

NON-LINEAR SATELLITE STATE MODELING TECHNIQUES

CROSS-REFERENCE TO RELATED APPLICATIONS; BENEFIT CLAIM

This application claims the benefit of Provisional Application Ser. No. 63/019,233, filed May 1, 2020, the entire contents of which are hereby incorporated by reference as if fully set forth herein, under 35 U.S.C. § 119(e).

FIELD OF THE DISCLOSURE

The present disclosure generally relates to global navigation satellite systems (GNSS), and relates more specifically to non-linear modeling techniques for satellite state data usable to improve GNSS accuracy and/or GNSS ground infrastructure system operation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The term Global Navigation Satellite System (GNSS) refers to any global satellite positioning system. A GNSS typically includes a set of satellites that orbit the Earth. Examples of GNSS that have been deployed include Global Positioning System (GPS), Galileo, Quazi Zenith Satellite System (QZSS), Indian Regional Navigation Satellite System (IRNSS), BeiDou, and Globalnaya Navigatsionnaya Sputnikovaya Sistema (GLONASS).

A GNSS receiver can calculate its own position based on distances between the GNSS receiver and a set of GNSS satellites. A GNSS signal broadcast by a GNSS satellite has information required for the GNSS receiver to make the calculations required to calculate an estimate of its own position. The required information includes the position of a set of GNSS satellites and time information associated with the set of GNSS satellites. In general, the distance-based calculations are also based on the time a signal takes to travel between the GNSS satellite and the GNSS receiver given that the signals travel at the speed of light. Thus, the distance-based calculations are very sensitive to small errors in satellite state data, such as the position of a satellite and a satellite's clock. The calculations are also sensitive to atmospheric conditions along the path of the signal, such as ionospeheric and tropospheric errors.

The GNSS satellite states are affected by many factors that are difficult to model. The position of the satellite is a non-linear dynamical system. A dynamical system is a system whose state evolves with time. GNSS satellites are affected by lots of biases that amplify errors over time, in part due to the system's non-linearity. A non-linear dynamical system can be highly sensitive to small effects at an earlier state, as understood in chaos theory (and more commonly understood as the "butterfly effect").

In modern GNSS systems, accurately computed satellite state data is uploaded to GNSS satellites. The computed satellite state data is necessary in order for GNSS receivers to generate useful position data. Position data calculations based on GNSS signals without the updated satellite state data will not be accurate enough for most tasks that use GNSS position data. Typical GNSS systems constantly update orbit data and clock data for the GNSS satellites in order to maintain the usability and/or accuracy of the GNSS signals.

Although the behavior of satellites is non-linear, typical GNSS systems use linearized models to estimate satellite state data.

SUMMARY

The appended claims may serve as a summary of the invention.

Figure 1:
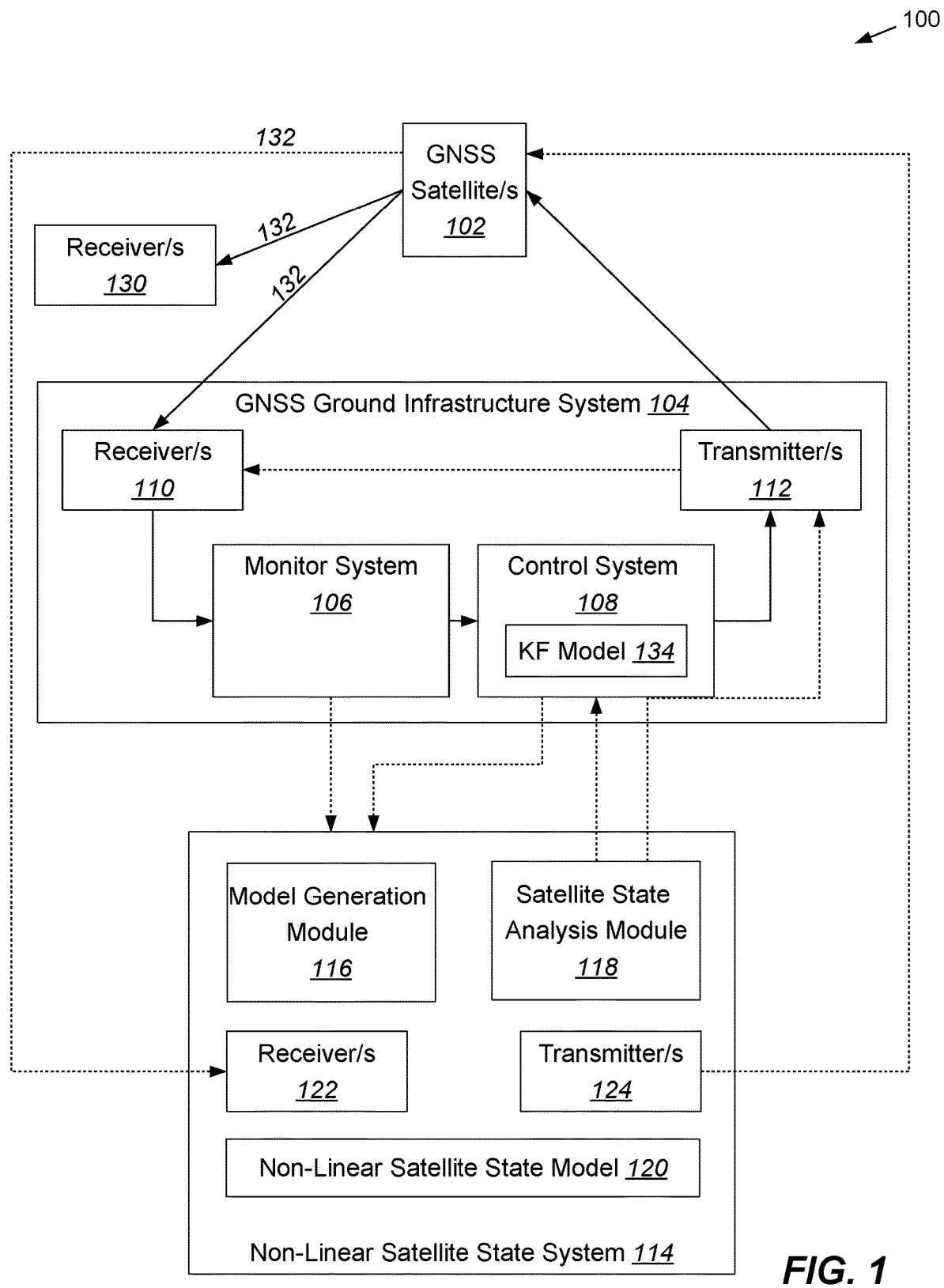
FIG. 1 illustrates a GNSS system that includes a non-linear satellite state system in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

General Overview

This document generally describes systems, methods, devices, and other techniques for non-linear satellite state modeling techniques. One or more techniques described herein allow for the accurate and/or efficient processing of GNSS data to improve computations of satellite state information, such as orbit states and clock states.

In some implementations, the various techniques described herein may achieve one or more of the following advantages: improving the accuracy of calculating estimates for satellite state data, such as but not limited to orbit data and clock data; improving the accuracy of a GNSS system; simplifying operations of a GNSS ground infrastructure system; improving performance of a GNSS system; improving performance of a GNSS ground infrastructure system; improving performance of a GNSS receiver; reducing the computational load to achieve a particular GNSS system accuracy based on the accuracy of satellite state data estimates; and eliminating or reducing the need for parallel processing and/or post-processing to achieve a particular GNSS system accuracy based on the accuracy of satellite state data estimates. Additional features and advantages are apparent from the specification and the drawings.

System Overview

FIG. 1 illustrates a GNSS system that includes a non-linear satellite state system in an example embodiment. A GNSS system 100 is a three-dimensional positioning system. The GNSS system 100 includes a set of GNSS satellites 102, a GNSS ground infrastructure system 104, and a non-linear satellite state system 114.

Typical GNSS satellites 102 orbit thousands of miles above the Earth. The GNSS satellites 102 broadcast one-way GNSS signals 132 that are used by receivers 130 to calculate their respective positions. A receiver 130 typically uses an antenna to receive GNSS signals 132 from multiple GNSS satellites 102 to calculate its position. Typically, the position calculation is based on the satellite position of selected GNSS satellites 102 and the time it takes GNSS signals 132 to travel from each selected GNSS satellite 102 to the receiver 130. As used herein, the term calculate may refer to calculating an estimate. For example, the receiver 130 calculates an estimate of its position using the GNSS signals 132.

GNSS signals 132 are typically driven by atomic clocks at the GNSS satellites 102 GNSS signal 132 may include one or more carrier signals that are generated based on oscillations of the satellite clock. In addition to the carrier signal/s, the GNSS signal 132 may include satellite state data, such as but not limited to satellite orbit data, satellite clock data or other data describing the satellite state. As used herein, the term orbit data refers to any data that can describe the satellite's state at a moment in time, such as but not limited to position data, ephemeris data, or other data that can describe the satellite's state.

Calculating Position

In general, a receiver 130 can calculate its position by calculating a set of pseudoranges between itself and a set of selected GNSS satellites 102 using the corresponding GNSS signals 132. A pseudorange corresponds to a distance between the receiver 130 and a GNSS satellite 102, but includes uncertainty due to the receiver's clock. A receiver 130 calculates a pseudorange for a particular GNSS satellite 102 based on the time that it takes a GNSS signal 132 to reach the receiver 130 from the particular GNSS satellite 102. A pseudorange may also include atmospheric errors.

If the GNSS receiver's clock's accuracy did not need to be taken into account, the location of a receiver 130 could be calculated with three distance calculations from three GNSS satellites 102. That is, with three accurate distances, the receiver 130 could make computations to solve for its location (e.g. x, y, z coordinates in 3-dimensional space). However, a standard clock in a receiver 130 is not accurate enough to generate a meaningful distance between the receiver 130 and a single GNSS satellite 102. For example, if one pseudorange is calculated using a typical quartz crystal clock in a receiver 130, the calculation may become offset by hundreds of meters even one second after correction of the quartz crystal clock.

By calculating a pseudorange of an additional fourth satellite, the time error can also be estimated. That is, by having the four pseudoranges and the receiver's location (e.g. x, y, z coordinates in 3-dimensional space), the time error of the receiver 130 clock can be computed accurately. The receiver 130 may also generate its position in a different coordinate system.

Alternatively and/or in addition, a receiver 130 may also generate carrier phase measurements. Carrier phase measurements are based on a frequency of the GPS signals 132 and a frequency of an oscillator at a receiver 130. Carrier phase measurements can provide additional information and much greater accuracy compared to pseudorange.

The calculations to estimate the position of a receiver 130 require knowledge of the position of the relevant GNSS satellites 102. The GNSS signal 132 includes orbit parameters from which the receiver 130 can calculate the position of each GNSS satellite 102. The GNSS ground infrastructure system 104 models the GNSS satellite orbits in order to provide a satellite's position data, as described in greater detail hereinafter.

GNSS Ground Infrastructure System

The GNSS ground infrastructure system 104 performs functionality to operate the GNSS system 100. Typically, this functionality includes continually monitoring, calculating, and correcting satellite state data that describes the GNSS satellites 102. For example, the GNSS ground infrastructure system 104 may collect data on the GNSS satellites 102 including GNSS signals 132, compute satellite state data based on the collected data, and upload satellite state data to the GNSS satellites 102. One example of the GNSS ground infrastructure system 104 is the GPS Control Segment.

The GNSS ground infrastructure system 104 includes a monitor system 106. The monitor system 106 uses one or more receivers 110 to collect GNSS signals 132 broadcast by one or more GNSS satellites 102. In some embodiments, the receiver/s 110 are specialized receivers. For example, the receiver/s 110 may have technology that improves precision, may be located at precisely-known locations, or may have other specialized features. In a typical GNSS ground infrastructure system 104, the monitor system 106 includes a network of stations with precisely-known locations to collect GNSS signals 132. The monitor system 106 may also collect other data related to GNSS accuracy and/or operation, such as atmospheric data.

The GNSS ground infrastructure system 104 includes a control system 108. The control system 108 receives GNSS signal data from the monitor system 106 and uses the GNSS signal data to calculate an estimate of satellite state data. For example, the GPS Control Segment includes a Master Control Station that receives GNSS signal data from a plurality of monitor stations. The GNSS signal data may include raw GNSS signal data as received by the receivers 130 and/or processed GNSS signal data, such as pseudorange calculations, carrier phase measurements, or other values generated by processing the raw GNSS signal data.

The satellite state data calculated by the control system 108 may include one or more of satellite orbit data, satellite clock data, or other data describing the satellite state. The GNSS ground infrastructure system 104 periodically sends updated satellite state data to the GNSS satellites 102 using transmitters 112 to update the satellite state data at the GNSS satellites 102. The updated satellite state data may include new satellite state data values, error values, or other values usable to determine the most recent satellite state values estimated by the control system 108. The GNSS signals 132 broadcast by the GNSS satellites 102 includes the most recent satellite state values so that the receivers 130 may accurately calculate their positions based on the most recent satellite state values.

Linear Modeling Systems

Some GNSS ground infrastructure systems 104 calculate satellite state data based on a Kalman filter (KF) approach, which involves a recursive minimum mean-square estimation (RMMSE). Kalman filtering is a technique used for creating linear models of dynamical systems. For example, the control system 108 uses a KF model 134 to calculate estimates for the satellite state data. One example of a KF model 134 is Real-Time GIPSY-x (RTGx), a system of linearized dynamic equations. RTGx includes many complex models and software packages that together describe satellite movement and update GPS satellites with information necessary to make GPS more accurate.

While the KF model 134 is fundamentally a linear modeling approach for dynamical systems, the actual satellite state of the GNSS satellites 102 is non-linear. A non-linear dynamical system can be highly sensitive to small effects that were introduced at an earlier state. Because the accuracy of GNSS satellite 102 orbits are affected by many biases that amplify errors over time, the control system 108 must constantly update the KF model 134 and the satellite state data for the GNSS satellites 102 in order to maintain the usability and/or accuracy of the GNSS signals 132.

Adaptations to the linear KF approach, such as an extended KF, and an unscented KF have been made to improve localized performance around the most recent calculation or state estimate. However, these adaptations generally enable non-linear estimations only within a small range of a given state of a system at an earlier time. These adaptations are limited in their abilities to model non-linear GNSS satellite 102 states without continuous fine-tuning of the model's inputs and parameters to keep the models from diverging. Without these continuous updates, the inaccuracies in the models would grow.

Repeated iterative updates to the KF model 134 of the control system 108 are critical to its performance. The KF model 134 generally uses a parameterized model that is fit to a time series of the satellite state, such as the satellite orbit or satellite clock. The KF model 134 collects prior model state data and GNSS signal data as inputs and estimates parameters for the next time step. After the new KF model 134 parameters have been estimated, the KF model 134 can be propagated forward in time. The control system 108 generally includes a large set of KF models 134 for multiple aspects of the GNSS satellites102.

Satellite Orbit Data

An ephemeris gives the trajectory of a GNSS satellite 102. A receiver 130 uses ephemeris data describing the position of a particular GNSS satellite 102 in order to calculate the pseudorange for the particular GNSS satellite 102. Satellite orbits can be approximated using Keplerian equations, which describe orbital movement based on gravitational attraction between two spherical objects. However, Keplerian equations do not account for many factors that affect the orbit of a GNSS satellite 102, such as other gravitational interactions, atmospheric drag, solar radiation, the non-spherical shape of the objects, and other factors.

A Keplarian orbit can be defined using six parameters. Additional parameters may be added to account for non-Keplarian behavior. In typical GNSS systems 100, Keplarian orbital parameters are still used to approximate the orbital movement of GNSS satellites 102. Thus, the control system 108 may calculate satellite orbit data that includes Keplarian orbital parameters that are useful within a limited time range, and upload the satellite orbital data to the GNSS satellites 102.

Satellite Clock Data

Typically, GNSS satellites 102 include atomic clocks with high accuracy, referred to herein as satellite clocks. However, small inaccuracies may accumulate, which may introduce inaccuracies in position calculations by receivers 130. A satellite clock may drift based on various factors, such as moving in and out of the shadow of the Earth, gravitational changes, and other factors affecting their oscillators.

The GNSS ground infrastructure system 104 may monitor and correct the satellite clocks. For example, clock errors may be estimated based at least in part on the GNSS signal data. In some embodiments, the GNSS ground infrastructure system 104 may include one or more clocks that are even more accurate due to their inherent properties and/or maintenance. The GNSS ground infrastructure system may provide a clock error to the GNSS satellites 102 that is transmitted in the GNSS signals 132. While the GNSS satellite clocks may be recalibrated, allowing a known clock error keeps the satellite clock functional for longer.

Non-Linear Satellite State System

The non-linear satellite state system 114 implements non-linear modeling of satellite state data. The non-linear modeling can improve the accuracy of the GNSS system 100, such as by improving operation of the GNSS ground infrastructure system operation 104, as shall be described in greater detail hereinafter.

In some embodiments, the non-linear satellite state system 114 includes a model generation module 116, a non-linear satellite state analysis module 118, and a non-linear satellite state model 120. A "module" may be software and/or hardware stored in, or coupled to, a memory and/or one or more processors on one or more computers. Additionally or alternatively, a module may comprise specialized circuitry. For example, a module, such as model generation module 116 and/or satellite state analysis module 118, may be hardwired or persistently programmed to support a set of instructions to, and/or that are useful to, perform the functions discussed herein.

The model generation module 116 generates the non-linear satellite state model 120. The model generation module 116 may generate the non-linear satellite state model 120 based on GNSS signal data, such as raw GNSS signal data and/or processed GNSS signal data obtained from one or more receivers 122 and/or one or more components of the monitor system 106 of the GNSS ground infrastructure system 104. In some embodiments, the receiver/s 122 are specialized receivers. For example, the receiver/s 122 may have technology that improves precision, may be located at precisely-known locations, or may have other specialized features. In some embodiments, the model generation module 116 may generate the non-linear satellite state model 120 based on satellite state data, such as satellite state data generated by the control system 108 of a GNSS ground infrastructure system 104. For example, the model generation module 116 may generate the non-linear satellite state model 120 based on one or more outputs of the KF model 134. Model generation is described in greater detail hereinafter.

The satellite state analysis module 118 uses the non-linear satellite state model 120 to generate satellite state data. In some embodiments, the satellite analysis module 118 updates one or more GNSS satellites 102 by transmitting satellite state data generated using the non-linear satellite state module 120. For example, the satellite analysis module 118 may update GNSS satellites 102 using one or more transmitters 124 associated with the non-linear satellite state system 114, one or more transmitters 112 associated with the GNSS ground infrastructure system 104, and/or by providing the updated satellite state data to a control system 108 of a GNSS ground infrastructure system 104.

Model Generation

Figure 2:
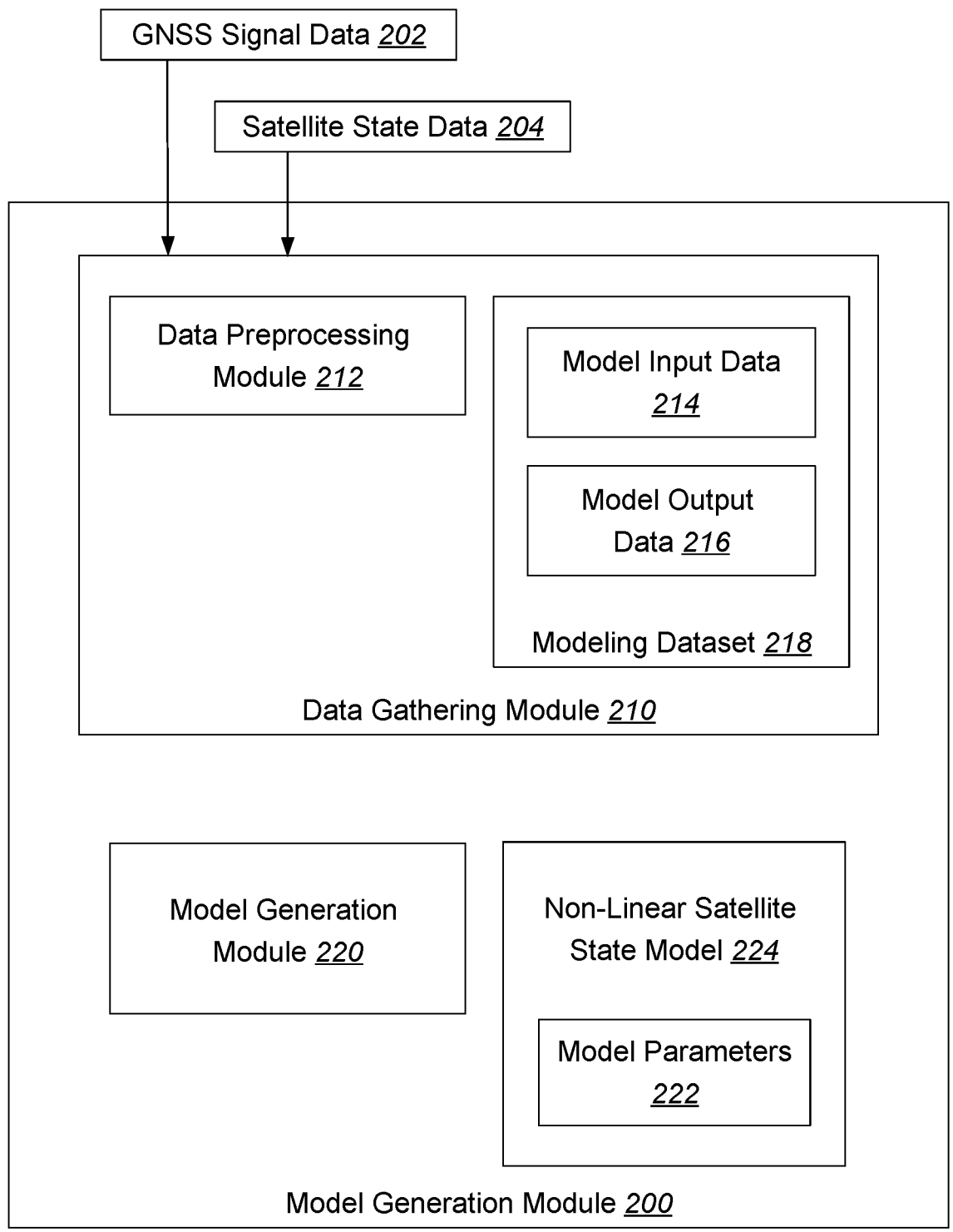
FIG. 2 illustrates a model generation module of a non-linear satellite state system in an example embodiment.

FIG. 2 illustrates a model generation module of a non-linear satellite state system in an example embodiment. The model generation module 200 includes a data gathering module 210, a model generation module 220, and a non-linear satellite state model 224.

The data gathering module 210 obtains GNSS signal data 202 and satellite state data 204. The data gathering module 210 may obtain the data over a direct physical link, a wireless link, a radio signal, a communications network, and/or any other communication medium.

The data gathering module 210 may obtain GNSS signal data 202 from one or more receivers (e.g. receiver 122) and/or one or more monitor systems (e.g. monitor system 106) of a GNSS ground infrastructure system (e.g. GNSS ground infrastructure system 104). The GNSS signal data 202 may include raw GNSS signal data and/or processed GNSS signal data.

The data gathering module 210 obtains satellite state data 204 associated with the GNSS signal data 202. In some embodiments, the data gathering module 210 obtains the satellite state data 204 from a control system (e.g. control system 108) of a GNSS ground infrastructure system (e.g. GNSS ground infrastructure system 104). For example, the satellite state data 204 may include one or more outputs of a KF model (e.g. KF model 134) of a control system. In some embodiments, the data gathering module 210 obtains the satellite state data 204 from another source, as described in greater detail hereinafter.

The model generation module 220 uses the modeling dataset 218 to generate the non-linear satellite state model 224. In some embodiments, the modeling dataset 218 includes model input values 214 generated based on the GNSS signal data 202 and model output values 216 generated based on the satellite state data 204. One or more sets of model input values 214 may be associated with one or more sets of model output values 216. For example, model input values 214 corresponding to GNSS signal data 202 collected at a particular time may be associated with model output values 216 corresponding to satellite state data 204 that was valid at the particular time. In some embodiments, the modeling dataset 218 includes a plurality of vectors and/or matrices that represent one or more instances of GNSS signal data 202 and corresponding satellite state data 204.

The data gathering module 210 may include a data preprocessing module 212. The data preprocessing module 212 prepares the GNSS signal data 202 and/or the satellite state data 204 for use by the model generation module 220. For example, the data preprocessing module 212 may consistently format the GNSS signal data 202 and/or the satellite state data 204.

The data preprocessing module 212 may evaluate individual instances of data for completeness, flag anomalous data, verify the quality of data, apply one or more data correction techniques, apply one or more data transformations, and the like. In some embodiments, the data preprocessing module 212 prepares the GNSS signal data 202 and/or the satellite state data 204 for use with one or more machine learning techniques, such as by implementing one or more data cleaning and/or conditioning techniques. Example machine learning techniques are described in greater detail hereinafter.

The model generation module 220 generates the non-linear satellite state model 224. For example, the model generation module 220 may select and/or adjust a structure of the non-linear satellite state model 224, select and/or adjust one or more model parameters 222 of the non-linear satellite state model 224, evaluate the accuracy of the non-linear satellite state model 224, update and/or revise the non-linear satellite state model 224, or otherwise maintain the non-linear satellite state model 224. In some embodiments, the model parameters 222 include a plurality of vectors and/or matrices that represent individual weights or other model parameters 222 that define the operation of the non-linear satellite state model 224.

After the non-linear satellite state model 224 is generated, the non-linear satellite state model 224 may be used to process input GNSS signal data to generate output satellite state data, such as orbit data and/or clock data. For example, the non-linear satellite state model 224 may generate a set of Keplerian orbit parameters that define an orbit of one or more GNSS satellites (e.g. GNSS satellites 102). Alternatively and/or in addition, the non-linear satellite state model 224 may generate a set of parameters that define a clock error of one or more GNSS satellites.

The output satellite state data can be used to update GNSS satellites. In some embodiments, non-linear satellite state model 224 may enhance and/or replace control system (e.g. control system 108) functionality. For example, the non-linear satellite state model 224 may replace a KF model (e.g. KF model 134) in a GNSS ground infrastructure system (e.g. GNSS ground infrastructure system 104). The KF estimation includes the position, velocity, clock and solar pressure states of the satellite. In some embodiments, the KF estimation includes covariances, which may not be meaningful for non-linear models such as the AI model.

In some embodiments, the non-linear satellite state model 224 may calculate estimates for other dynamical aspects related to the GNSS satellites, such as but not limited to troposphere properties, ionosphere properties, properties of dynamic forces acting on the GNSS satellites, satellite attitude data, satellite thermal properties, and the like.

In some embodiments, the model generation module 220 generates the non-linear satellite state model 224 using one or more machine learning techniques. For example, the non-linear satellite state model 224 may include one or more model parameters 222 that are calculated and/or identified using support vector machines (SVMs), artificial neural networks (ANNs), naïve Bayes classifiers, decision trees, random forests, regression models, deep learning models, classification techniques, matrix factorization techniques, clustering techniques, collaborative filtering techniques, and/or other statistical models or machine learning techniques. The retraining or execution of the statistical models may also be performed on an offline, online, and/or on-demand basis to accommodate requirements or limitations associated with the processing, performance, or scalability of the non-linear satellite state model 224.

Example Model

Figure 3:
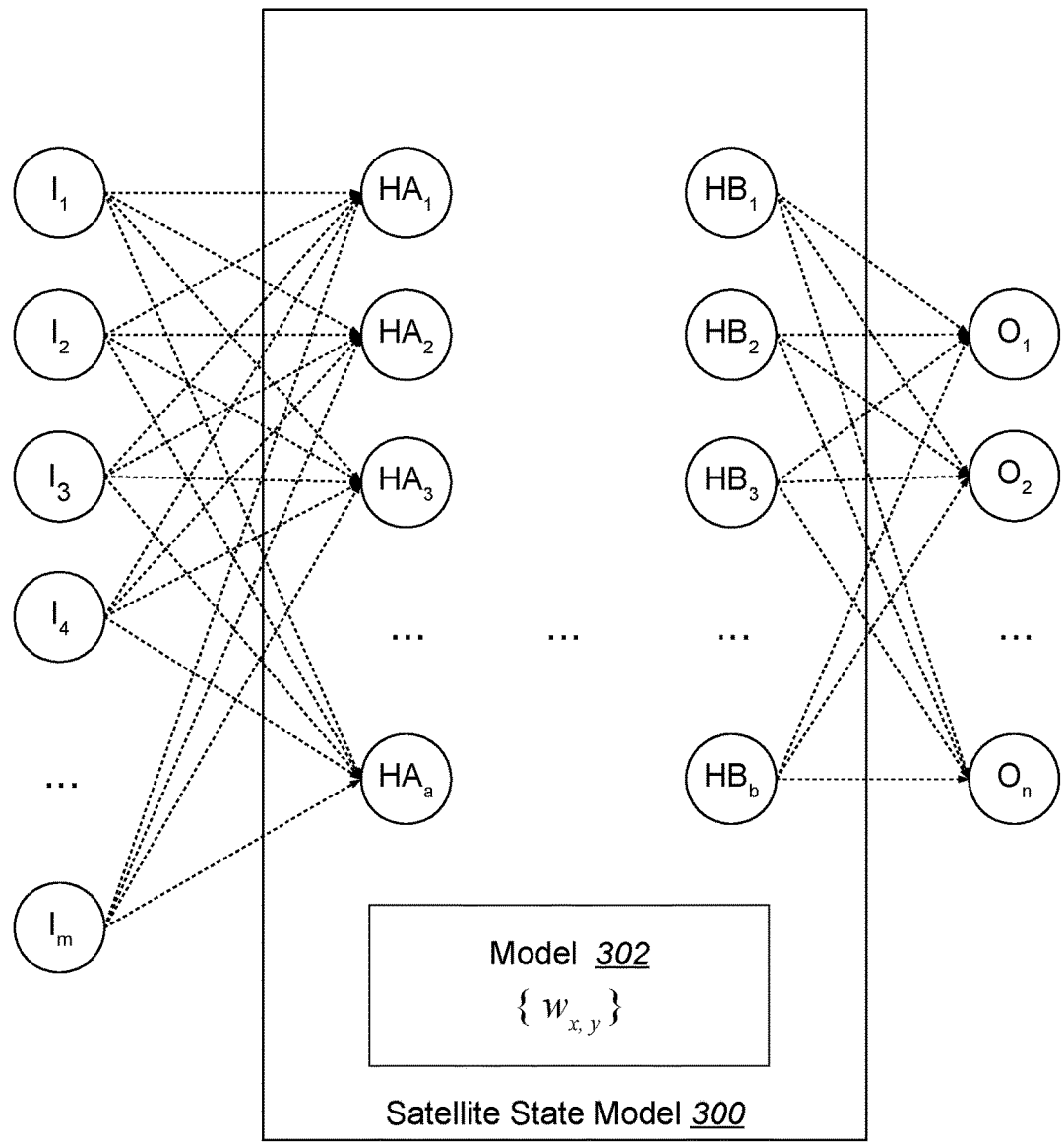
FIG. 3 illustrates a satellite state model in an example embodiment.

FIG. 3 illustrates a satellite state model in an example embodiment. The satellite state model 300 is an artificial neural network with model parameters 302 that include a set of weights $W_{x,y}$. The satellite state model 300 includes an input layer of artificial input neurons $I_1$-$I_m$, one or more hidden layers with neurons ($HA_1$-$HA_a$, $HB_1$-$HB_b$), and an output layer of artificial output neurons $O_1$-$O_n$.

A model generation module (e.g. model generation module 220) may generate the satellite state model 300 by training the satellite state model 300 on a training data set (e.g. modeling data set 218) that includes training input values (e.g. model input values 214 based on GNSS signal data 202) and training output values (e.g. model output values 216 based on satellite state data 204).

The training data set may include a plurality of instances that are fed through the artificial neural network. Each instance may include model input values corresponding to GNSS signal data (e.g. GNSS signal data 202) collected at a particular time, as well as model output values corresponding to satellite state data (e.g. satellite state data 204) that was valid at the particular time. Instances of GNSS signal data and the associated satellite state data used to train the model are referred to herein as training instances.

When one training instance associated with particular GNSS signal data and particular satellite state data is propagated through the satellite state model 300, the corresponding model input values are assigned to the artificial input neurons $I_1$-$I_m$. The model parameters 302 $W_{x,y}$ of the satellite state model 300 model are weights that are applied to the relationship between a particular artificial neuron x and another artificial neuron y in different layers of the satellite state model 300. For example, $W_{s1, HA1}$ affects the relationship between the artificial input neuron $S_1$ and $HA_1$, a neuron in hidden neuron layer A. The model input values may be propagated through the satellite state model 300 as a vector I, one or more intermediate vectors at each hidden neuron layer, and an output vector o that represents an output of the satellite state model 300.

The model parameters 302 between the artificial neurons are adjusted during a training phase to adjust the satellite state model 300. For example, the initial weights of the network may be randomly selected and iteratively adjusted until the model converges to an acceptable state. At the acceptable state, the output of the satellite state model 300 at the artificial output neurons $O_1$-$O_n$, or the output vector o, accurately predicts model output values (e.g. model output values 216 corresponding to satellite data 204, such as but not limited to one or more output values from a KF model (e.g. KF model 134) of a control system (e.g. control system 108)) for the corresponding model input values (e.g. model input values 214 corresponding to GNSS signal data 202). The model output values that correspond to the observed satellite state data in a training instance may be represented by a vector O that may be compared to the model's output o to adjust the satellite state model 300. The model parameters 302 may be adjusted based on a measure of similarity between the training instance satellite state data O and the model's output o.

In some embodiments, the satellite state model 300 includes an artificial neural network that is trained using a supervised feedforward error back-propagation training algorithm. This type of algorithm has high noise resistance and permits experiential acquisition of input/output mapping within the multilayer network.

In some embodiments, a satellite state model (e.g. satellite state model 300, 224, and/or 120) may include one or more artificial neural networks and/or other machine learning components arranged within the satellite state model. For example, aspects of the satellite state with no dependencies and/or limited dependencies may be represented by components within a satellite state model.

Replacing the Kf Model

In some embodiments, one or more non-linear satellite state models (e.g. satellite state model 300, 224, and/or 120) as described herein may be used in a GNSS ground infrastructure system (e.g. GNSS ground infrastructure system 104). In some embodiments, model generation module (e.g. model generation module 116, 200) may simply generate a non-linear satellite state model (e.g. non-linear satellite state model 120) that replaces a KF model (e.g. KF model 134) within a control system (e.g. control system 108). For example, the non-linear satellite state system (e.g. non-linear satellite state system 114) may provide the non-linear satellite state model (e.g. non-linear satellite state model 120) to the control system (e.g. 108). Alternatively and/or in addition, the non-linear satellite state system may provide an application programming interface (API) and/or a service over a network to allow a control system to use the non-linear satellite state model.

Figure 4:
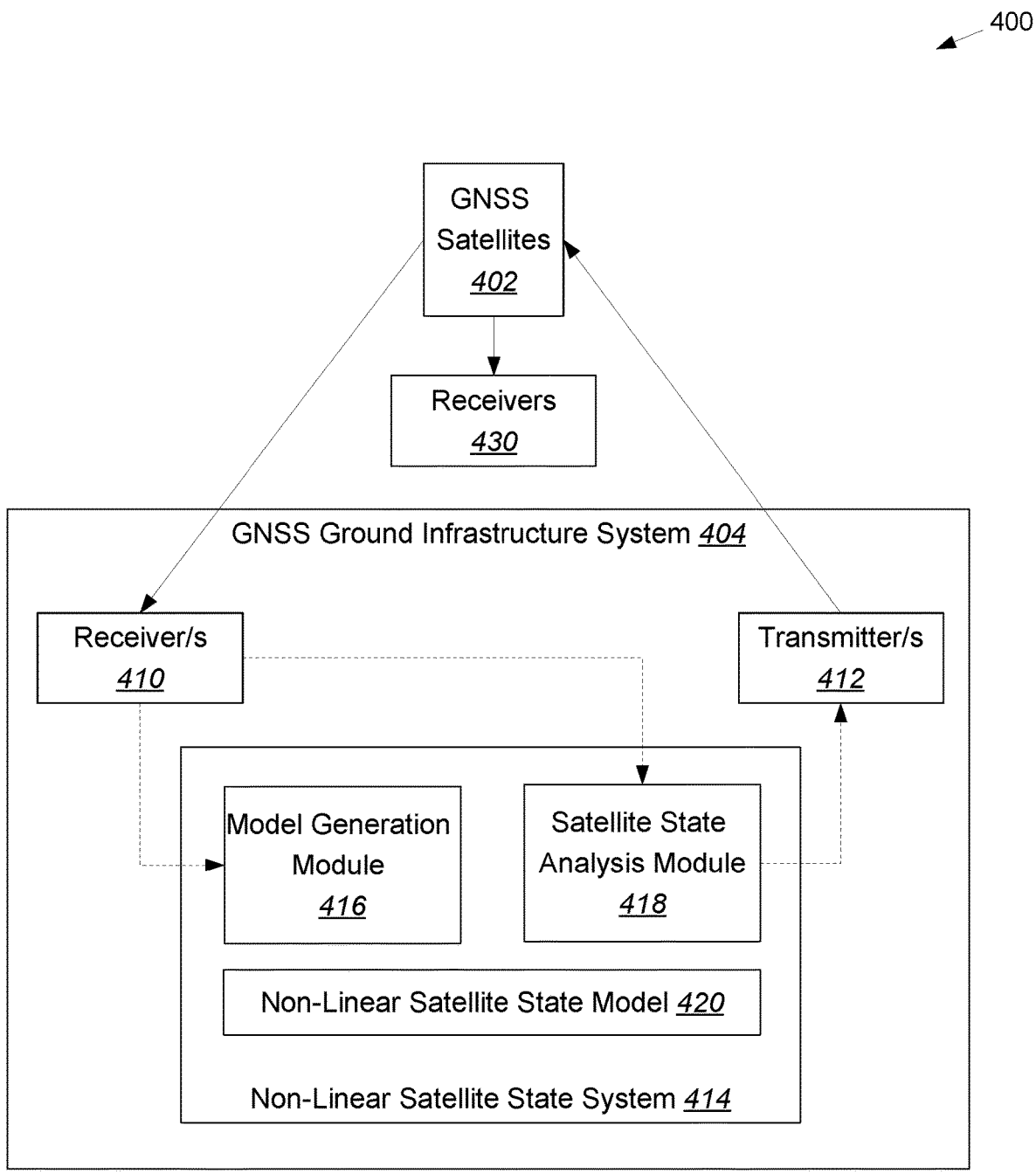
FIG. 4 illustrates a GNSS system that includes a non-linear satellite state system in an example embodiment.

Using the Non-Linear Satellite State System in a GNSS Ground Infrastructure System In some embodiments, the non-linear satellite state system (e.g. non-linear satellite state system 114) may replace and/or perform functionality of the GNSS ground infrastructure system. FIG. 4 illustrates a GNSS system that includes a non-linear satellite state system in an example embodiment. The GNSS system 400 includes GNSS satellites 402 that broadcast one-way GNSS signals that are used by receivers 430 to calculate their positions. The GNSS ground infrastructure system 404 performs functionality related to operation of the GNSS system 400.

The GNSS ground infrastructure system 404 includes a non-linear satellite state system 414 that monitors and corrects satellite state data that describes the GNSS satellites 402. In some embodiments, the non-linear satellite state system 414 includes a model generation module 416 that collects data on the GNSS satellites 402 using one or more receivers 410 to generate a non-linear satellite state model 420 that calculates satellite state data. The non-linear satellite state model 420 may require less maintenance, perform faster calculations, and/or perform more accurate calculations of satellite state data compared to a KF model (e.g. KF model 134). In some embodiments, the receiver/s 410 are specialized receivers. For example, the receiver/s 410 may have technology that improves precision, may be located at precisely-known locations, or may have other specialized features.

In some embodiments, the non-linear satellite state system 414 includes a satellite state analysis module 418. The satellite state analysis module 418 uses the non-linear satellite state model 420 to process GNSS signal data and generate satellite state data. For example, the satellite state analysis module 418 may use one or more receivers 410 to obtain input GNSS signal data, process the GNSS signal data using the non-linear satellite state model 420 to generate updated satellite state data, and update one or more GNSS satellites 402 by transmitting the updated satellite state data to the GNSS satellites 402 using one or more transmitters 412. In some embodiments, the non-linear satellite state system 414 updates the non-linear satellite state model 420 based on future GNSS signal data.

Providing the Non-Linear Satellite State Model to a Receiver

Figure 5:
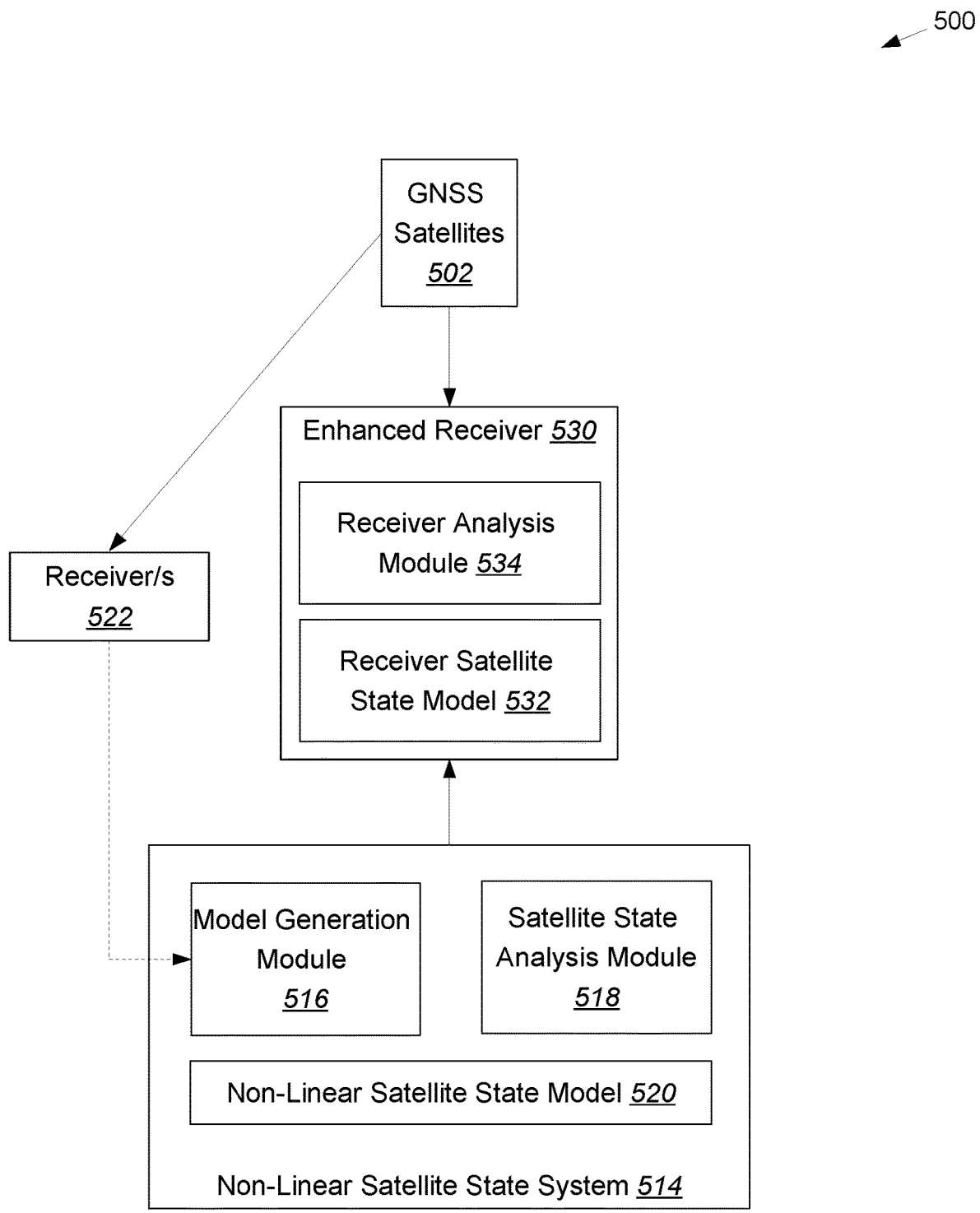
FIG. 5 illustrates an enhanced receiver with a non-linear satellite state model in an example embodiment.

In some embodiments, a receiver may be provided with a non-linear satellite state model. FIG. 5 illustrates an enhanced receiver with a non-linear satellite state model in an example embodiment. In the GNSS system 500, GNSS satellites 502 broadcast one-way GNSS signals. A non-linear satellite state system 514 includes a model generation module 516 that collects data on the GNSS satellites 502 using one or more receivers 522 to generate a non-linear satellite state model 520 that calculates satellite state data. In some embodiments, the non-linear satellite state system 514 includes a satellite state analysis module 518. The satellite state analysis module 518 uses the non-linear satellite state model 520 to generate satellite state data.

The non-linear satellite state system 514 provides a receiver satellite state model 532 and/or receiver analysis module 534 to an enhanced receiver 530. The enhanced receiver 530 may use the receiver analysis module 534 to process GNSS signal data from the GNSS satellites 502 using the receiver satellite state model 532.

The receiver satellite state model 532 and/or the receiver analysis module 534 may include code or other computer instructions that, when executed by a processer in the enhanced receiver 530, processes GNSS signal data to generate satellite state data. The enhanced receiver 530 may use the satellite state data generated by the receiver analysis module 534 to perform accurate positioning calculations. In some embodiments, the receiver analysis module 534 and the receiver satellite state model 532 are provided in a single package of code.

Alternatively and/or in addition, the receiver satellite state model 532 and/or the receiver analysis module 534 may include hardware, such as a programmed chip, processor, and/or other hardware device that processes GNSS signal data, generates satellite state data, and/or performs accurate positioning calculations. A hardware device that includes the receiver satellite state model 532 and/or the receiver analysis module 534 may be introduced into receiver devices such as the enhanced receiver 530. In some embodiments, the hardware device is a GPS chip.

Providing Satellite State Data as a Service

Accurate satellite state data is useful outside of management of a GNSS system (e.g. GNSS system 100). For example, private entities may generate and/or use satellite state data to generate more accurate GNSS data and/or improve modeling of other complex phenomena dependent on satellite state data. In some embodiments, a non-linear satellite state model is generated in accordance with the techniques described herein, and the satellite state model is used to process GNSS signal data and provide the satellite state data to a third-party.

For example, a non-linear satellite state system, satellite orbit data and/or clock data may be used in orbit determination for scientific and/or private satellites, gravity recovery, environmental monitoring applications, geological applications such as plate tectonics, terrestrial reference frame determination, climate monitoring, time synchronization, and other applications.

Example Processes

Figure 6:
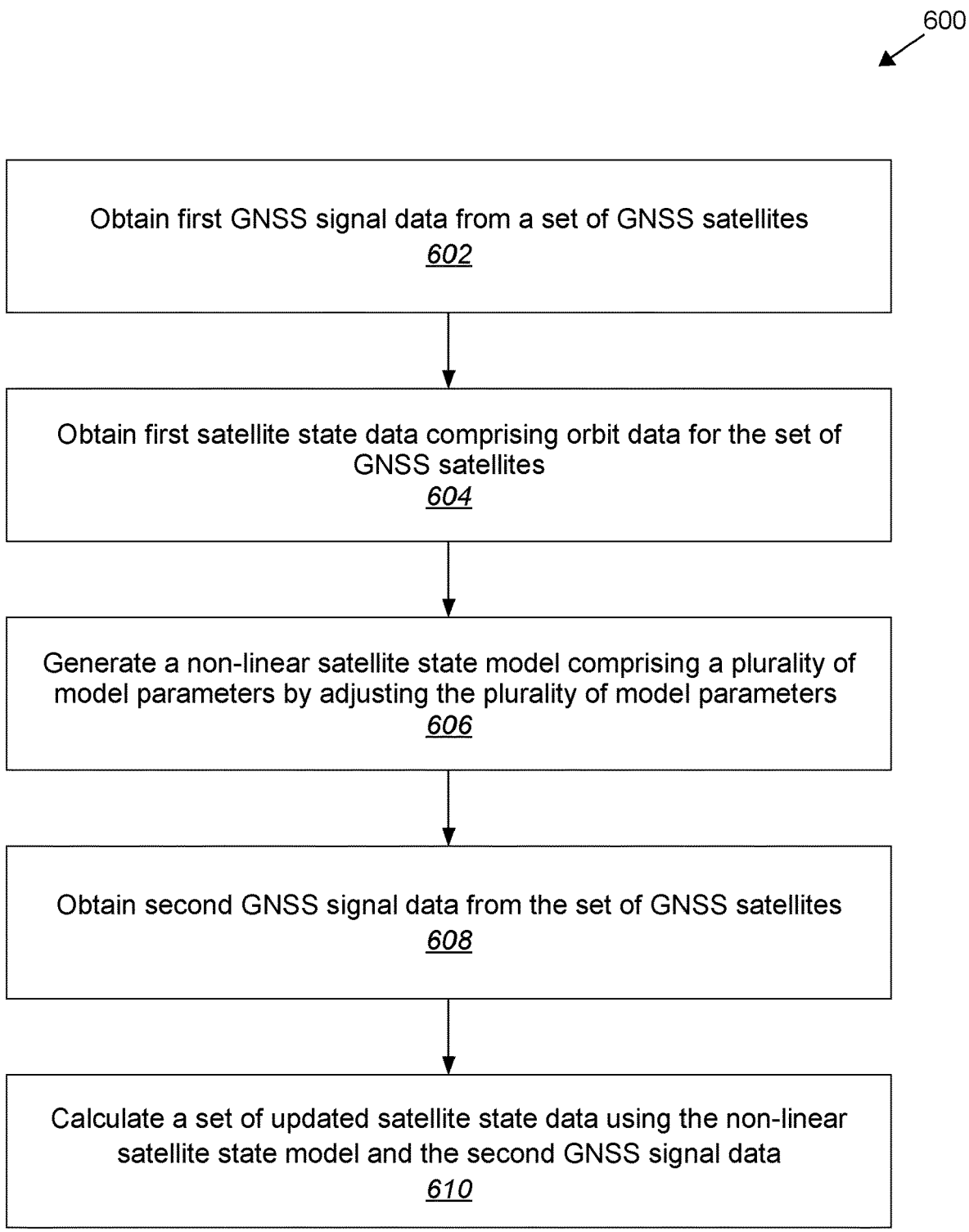
FIG. 6 is a flow diagram of a process for non-linear satellite state modelling in an example embodiment.

FIG. 6 is a flow diagram of a process for modeling satellite state data in an example embodiment. Process 600 may be performed by one or more computing devices and/or processes thereof. For example, one or more blocks of process 600 may be performed by a computer system, such as but not limited to computer system 700. In one embodiment, one or more blocks of process 600 are performed by a non-linear satellite state system, such as a non-linear satellite state system 114. Process 600 will be described with respect to non-linear satellite state system 114, but is not limited to performance by such.

At block 602, the non-linear satellite state system 114 obtains first GNSS signal data from a set of GNSS satellites. For example, the non-linear satellite state system 114 may obtain GNSS signal data from a receiver (e.g. receiver 122) and/or a monitor system (e.g. monitor system 106) of a GNSS ground infrastructure system (e.g. GNSS ground infrastructure system 104).

At block 604, the non-linear satellite state system 114 obtains first satellite state data comprising orbit data for the set of GNSS satellites. For example, the non-linear satellite state system 114 may obtain first satellite state data from a control system (e.g. control system 108) of a GNSS ground infrastructure system (e.g. GNSS ground infrastructure system 104). The first satellite state data may be generated by a KF model (e.g. KF model 134). Alternatively, the satellite state data may be generated by the same or different non-linear satellite state system 114.

At block 606, the non-linear satellite state system 114 generates a non-linear satellite state model comprising a plurality of model parameters. The non-linear satellite state model may be generated by adjusting the plurality of model parameters based on the first GNSS signal data and the first satellite state data. The non-linear satellite state model outputs satellite state data based on GNSS signal data. In some embodiments, the non-linear satellite state model is a machine learning model.

At block 608, the non-linear satellite state system 114 obtains second GNSS signal data from the set of GNSS satellites.

At block 610, the non-linear satellite state system 114 calculates a set of updated satellite state data comprising one or more updated values using the non-linear satellite state model and the second GNSS signal data.

Implementation Mechanisms—hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 7:
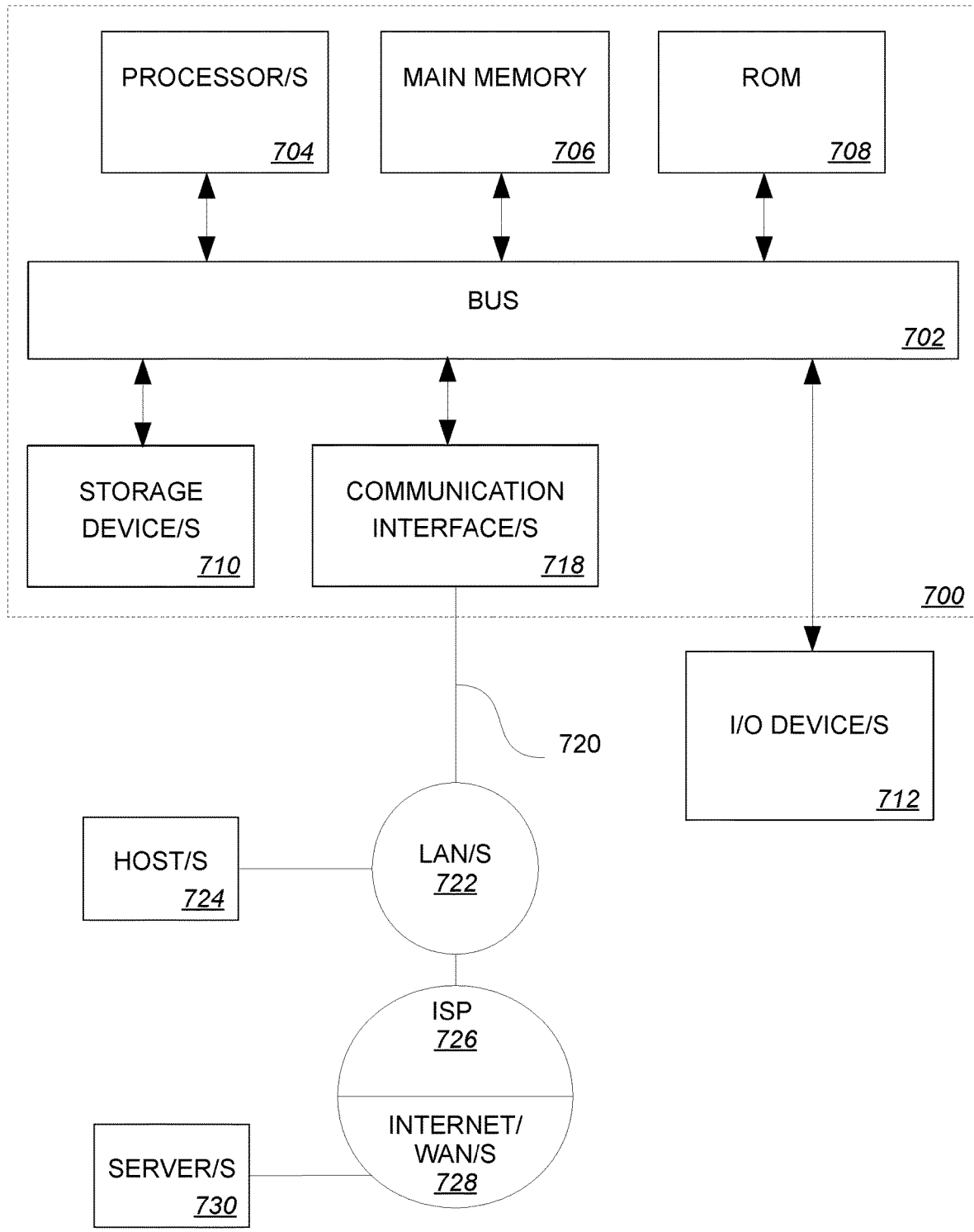
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and one or more hardware processors 704 coupled with bus 702 for processing information, such as basic computer instructions and data. Hardware processor/s 704 may include, for example, one or more general-purpose microprocessors, graphical processing units (GPUs), coprocessors, central processing units (CPUs), and/or other hardware processing units.

Computer system 700 also includes one or more units of main memory 706 coupled to bus 702, such as random access memory (RAM) or other dynamic storage, for storing information and instructions to be executed by processor/s 704. Main memory 706 may also be used for storing temporary variables or other intermediate information during execution of instructions by processor/s 704. Such instructions, when stored in non-transitory storage media accessible to processor/s 704, turn computer system 700 into a special-purpose machine that is customized to perform the operations specified in the instructions. In some embodiments, main memory 706 may include dynamic random-access memory (DRAM) (including but not limited to double data rate synchronous dynamic random-access memory (DDR SDRAM), thyristor random-access memory (T-RAM), zero-capacitor (Z-RAMT™)) and/or non-volatile random-access memory (NVRAM).

Computer system 700 may further include one or more units of read-only memory (ROM) 708 or other static storage coupled to bus 702 for storing information and instructions for processor/s 704 that are either always static or static in normal operation but reprogrammable. For example, ROM 708 may store firmware for computer system 700. ROM 708 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 710, such as a magnetic disk or optical disk, is provided and coupled to bus 702 for storing information and/or instructions. Storage device/s 710 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 700 may be coupled via bus 702 to one or more input/output (I/O) devices 712. For example, I/O device/s 712 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 712 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 704 and for controlling cursor movement on another I/O device (e.g. a display). This input device typically has degrees of freedom in two or more axes, (e.g. a first axis x, a second axis y, and optionally one or more additional axes z . . . ), that allows the device to specify positions in a plane. In some embodiments, the one or more I/O device/s 712 may include a device with combined I/O functionality, such as a touch-enabled display.

Other I/O device/s 712 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor/s 704 over bus 702.

Computer system 700 may implement the techniques described herein using customized hard-wired logic, one or more ASICs or FPGAs, firmware or program logic which, in combination with the computer system causes or programs, causes computer system 700 to be a special-purpose machine. According to one embodiment, the techniques herein are performed by computer system 700 in response to processor/s 704 executing one or more sequences of one or more instructions contained in main memory 706. Such instructions may be read into main memory 706 from another storage medium, such as one or more storage device/s 710. Execution of the sequences of instructions contained in main memory 706 causes processor/s 704 to perform the process steps described herein. In alternative embodiments, hard-wired circuitry may be used in place of or in combination with software instructions.

Computer system 700 also includes one or more communication interfaces 718 coupled to bus 702. Communication interface/s 718 provide two-way data communication over one or more physical or wireless network links 720 that are connected to a local network 722 and/or a wide area network (WAN), such as the Internet. For example, communication interface/s 718 may include an integrated services digital network (ISDN) card, cable modem, satellite modem, or a modem to provide a data communication connection to a corresponding type of telephone line. Alternatively and/or in addition, communication interface/s 718 may include one or more of: a local area network (LAN) device that provides a data communication connection to a compatible local network 722; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network; and other networking devices that establish a communication channel between computer system 700 and one or more LANs 722 and/or WANs.

Network link/s 720 typically provides data communication through one or more networks to other data devices. For example, network link/s 720 may provide a connection through one or more local area networks 722 (LANs) to one or more host computers 724 or to data equipment operated by an Internet Service Provider (ISP) 726. ISP 726 in turn provides connectivity to one or more wide area networks 728, such as the Internet. LAN/s 722 and WAN/s 728 both use electrical, electromagnetic or optical signals that carry digital data streams. The signals through the various networks and the signals on network link/s 720 and through communication interface/s 718 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its main memory 706 and send the instructions over a telecommunications line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 can send messages and receive data, including program code, through the network(s), network link 720 and communication interface 718. In the Internet example, one or more servers 730 might transmit signals corresponding to data or instructions requested for an application program executed by the computer system 700 through the Internet 728, ISP 726, local network 722 and a communication interface 718. The received signals may include instructions and/or information for execution and/or processing by processor/s 704. Processor/s 704 may execute and/or process the instructions and/or information upon receiving the signals by accessing main memory 706, or at a later time by storing them and then accessing them from storage device/s 710.

Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   one or more hardware processors;
   at least one memory coupled to the one or more hardware processors and storing one or more instructions which, when executed by the one or more hardware processors, cause the one or more hardware processors to:
      obtain first global navigation satellite systems (GNSS) signal data from a set of GNSS satellites;
      obtain first satellite state data generated by a model, the first satellite state data comprising estimated orbit data valid at one or more particular times for the set of GNSS satellites;
      generate a non-linear satellite state model comprising a plurality of model parameters by adjusting the plurality of model parameters using one or more machine learning techniques based on the first GNSS signal data and the first satellite state data, wherein the non-linear satellite state model generates output satellite state data based on GNSS signal data;
      obtain second GNSS signal data from the set of GNSS satellites; and
      for a particular GNSS satellite of the set of GNSS satellites, calculate updated satellite state data for use by the particular GNSS satellite, the updated satellite state data comprising one or more updated values describing the particular GNSS satellite's orbit data using the non-linear satellite state model and the second GNSS signal data.

2. The computer system of claim 1, wherein the non-linear satellite state model comprises an artificial neural network, wherein the plurality of model parameters comprise a plurality of weights of the artificial neural network.

3. The computer system of claim 1, wherein the first satellite state data is generated by a GNSS ground infrastructure system.

4. The computer system of claim 3, wherein the first satellite state data is obtained from the set of GNSS satellites.

5. The computer system of claim 1, wherein the one or more instructions, when executed by the one or more hardware processors, cause the one or more hardware processors to:
   provide the updated satellite state data for uploading to the GNSS satellites using one or more transmitters.

6. The computer system of claim 5, wherein providing the updated satellite state data for uploading to the GNSS satellites using one or more transmitters comprises providing the updated satellite state data to a GNSS ground infrastructure system.

7. The computer system of claim 1,
   wherein the first satellite state data includes a set of one or more clock error parameters for at least one GNSS satellite of the set of GNSS satellites, and
   wherein the updated satellite data includes one or more clock error parameters for the particular GNSS satellite.

8. The computer system of claim 1, wherein the satellite state data includes a set of one or more orbit parameters for at least one GNSS satellite of the GNSS satellites.

9. The computer system of claim 1, wherein the one or more instructions, when executed by the one or more hardware processors, cause the one or more hardware processors to:
cause transmission of the updated satellite state data to the particular GNSS satellite.

10. The computer system of claim 1, wherein the one or more instructions, when executed by the one or more hardware processors, cause the one or more hardware processors to:
for one or more additional GNSS satellites of the set of GNSS satellites, calculate additional updated satellite state data for use by the one or more additional GNSS satellites, the additional updated satellite state data comprising one or more updated values describing the one or more additional GNSS satellites' orbit data using the non-linear satellite state model and the second GNSS signal data.

11. The computer system of claim 1, wherein the model is a linear model that estimates the first satellite state data.

12. A method comprising:
obtaining first global navigation satellite systems (GNSS) signal data from a set of GNSS satellites;
obtaining first satellite state data generated by a model, the first satellite state data comprising estimated orbit data valid at one or more particular times for the set of GNSS satellites;
generating a non-linear satellite state model comprising a plurality of model parameters by adjusting the plurality of model parameters using one or more machine learning techniques based on the GNSS signal data and the satellite state data, wherein the non-linear satellite state model generates output satellite state data based on GNSS signal data;
obtaining second GNSS signal data from the set of GNSS satellites; and
for a particular GNSS satellite of the set of GNSS satellites, calculating updated satellite state data for use by the particular GNSS satellite, the updated satellite state data comprising one or more updated values describing the particular GNSS satellite's orbit data using the non-linear satellite state model and the second GNSS signal data;
wherein the method is performed by one or more computing devices.

13. The method of claim 12, wherein the non-linear satellite state model comprises an artificial neural network, wherein the plurality of model parameters comprise a plurality of weights of the artificial neural network.

14. The method of claim 12, wherein the first satellite state data is generated by a GNSS ground infrastructure system.

15. The method of claim 14, wherein the first satellite state data is obtained from the set of GNSS satellites.

16. The method of claim 12, further comprising:
providing the updated satellite state data for uploading to the GNSS satellites using one or more transmitters.

17. The method of claim 16, wherein providing the updated satellite state data for uploading to the GNSS satellites using one or more transmitters comprises providing the updated satellite state data to a GNSS ground infrastructure system.

18. The method of claim 8,
wherein the first satellite state data includes a set of one or more clock error parameters for at least one GNSS satellite of the set of GNSS satellites; and
wherein the updated satellite state data includes one or more clock error parameters for the particular GNSS satellite.

19. The method of claim 12, wherein the satellite state data includes a set of one or more orbit parameters for at least one GNSS satellite of the GNSS satellites.

20. The method of claim 12, wherein the model is a linear model that estimates the first satellite state data.

* * * * *